US009252911B2

(12) United States Patent
Huang et al.

(10) Patent No.: US 9,252,911 B2
(45) Date of Patent: Feb. 2, 2016

(54) FLEXIBLE REMOTE NODE (RN) FOR DYNAMIC TRAFFIC ALLOCATION IN PASSIVE OPTICAL NETWORKING (PON) AND MOBILE BACKHAUL (MBH) APPLICATIONS

(71) Applicant: NEC Laboratories America, Inc., Princeton, NJ (US)

(72) Inventors: Ming-Fang Huang, Atlanta, GA (US); Dayou Qian, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 106 days.

(21) Appl. No.: 14/254,458

(22) Filed: Apr. 16, 2014

(65) Prior Publication Data

US 2014/0314104 A1    Oct. 23, 2014

Related U.S. Application Data

(60) Provisional application No. 61/812,349, filed on Apr. 16, 2013.

(51) Int. Cl.
*H04J 3/02*     (2006.01)
*H04J 14/02*    (2006.01)
*H04B 10/27*    (2013.01)
*H04Q 11/00*    (2006.01)

(52) U.S. Cl.
CPC ............ *H04J 14/0239* (2013.01); *H04B 10/27* (2013.01); *H04J 14/0282* (2013.01); *H04Q 11/0067* (2013.01); *H04Q 2011/0075* (2013.01)

(58) Field of Classification Search
CPC .................................................. H04J 14/0239
See application file for complete search history.

(56) References Cited

PUBLICATIONS

Yan Li et al(Integrated Fiber wireless (FiWi) Access Networks Supporting inter ONU Communications, IEEE, Journal of Lightwave technology, vol. 28, No. 5, Mar. 1, 2010).*
Jun-ichi Kani et al.(Energy Efficient optical Access Network Technologies, NTT Access network service systems laboratories, entire document, 2011).*
Ning Cheng et al. (Flexible TWDM PON system with pluggable optical transceivers modules, Huawei technologies, entire document, 2014).*
Kazutaka Hara et al. (Flexible load balancing technique using dynamic wavelength bandwidth allocation (DWBA) towards 100Gbits/s-class-WDM/TDM-PON ,NTT corporation, 2010,entire document).*

* cited by examiner

*Primary Examiner* — Maharishi Khirodhar
(74) *Attorney, Agent, or Firm* — Joseph Kolodka

(57) ABSTRACT

A computer implemented method for dynamically allocating traffic in a passive optical communication system includes employing an individual wavelength channel to carry different data services from an individual transmitter, configuring an optical network unit into optical network unit groups serving at least two community of users; and providing a flexible remote node with wavelength routing flexibility including switching wavelength traffic from optical network user groups with low capacity requirements to optical network user groups with increased wavelength traffic requirements.

14 Claims, 5 Drawing Sheets

FLEXIBLE REMOTE NODE (RN) FOR DYNAMIC TRAFFIC ALLOCATION IN PASSIVE OPTICAL NETWORKING (PON) AND MOBILE BACKHAUL (MBH) APPLICATIONS

RELATED APPLICATION INFORMATION

This application claims priority to provisional application No. 61/812,349 filed Apr. 16, 2013, the contents thereof are incorporated herein by reference

BACKGROUND OF THE INVENTION

1. Field of the Invention

The present invention relates generally to optical communications, and more particularly, to flexible remote node (RN) for dynamic traffic allocation in passive optical networking (PON) and mobile backhaul (MBH) applications.

2. Description of Related Art

The broadband connectivity demand for data services is expected to rise for access networks. Passive optical networks (PON) are now being deployed in large numbers worldwide to support access services. In the access network, the rapid growth in data services has also recently led to an exponentially growing demand. In wired services, hybrid wavelength division multiplexing (WDM), time division multiplexing (TDM) PON has been studied as one of the solutions for the emerged capacity requirement. In the normal case, each optical network unit (ONU) group has its own wavelength and shared data carried by the signal. However, it happens sometimes that some of the ONU groups need more capacity due to the particular events.

In the TDM based PON or mobile backhaul (MBH) systems, the easier solution for a busy traffic jam is partial idling. For example, 10 users in the same group share the service. In a situation where all users need full capacity, the typical solution for TDM-PON is to separate the time slot to each user. Therefore some of the users have to be idled and wait till the service comes back. In this situation, the service is not continuous.

Accordingly, there is a need for dynamic traffic allocation in passive optical networking (PON) and mobile backhaul (MBH) applications.

BRIEF SUMMARY OF THE INVENTION

The invention is directed to a computer implemented method for dynamically allocating traffic in a passive optical communication system includes employing an individual wavelength channel to carry different data services from an individual transmitter, configuring an optical network unit into optical network unit groups serving at least two community of users; and providing a flexible remote node with wavelength routing flexibility including switching wavelength traffic from optical network user groups with low capacity requirements to optical network user groups with increased wavelength traffic requirements.

In a similar aspect of the invention there is provided a system for dynamically allocating traffic in a passive optical communication system that includes an optical line terminal for employing an individual wavelength channel to carry different data services from an individual transmitter, an optical network unit configured into optical network unit groups serving at least two community of users, and a flexible remote node with wavelength routing flexibility including switching wavelength traffic from optical network user groups with low capacity requirements to optical network user groups with increased wavelength traffic requirements.

These and other advantages of the invention will be apparent to those of ordinary skill in the art by reference to the following detailed description and the accompanying drawings.

DETAILED DESCRIPTION

The present invention is directed to a directed to dynamic traffic allocation that can be realized by a flexible remote node (RN). The flexible remote node contains wavelength selective switching (WSS), array waveguide grating (AWG) and a multi-cast-switch (MCS). It can switch the traffic from low loading ONU groups to high loading ONU groups based on WDM technology. Employing the wavelength routing flexibility from the MCS, the traffic can be switched to support the user who needs huge capacity immediately.

An exemplary configuration of a hybrid WDM/TDM-PON, in accordance with the invention is shown in FIG. 1. At the optical line terminal (OLT) (101), each transponder contains a distributed feedback (DFB) laser, followed by a transmitter (TX) (1.1), where N denotes the number of WDM channels. For the TX, it can be any kind of transmitter such as EPON TX, GPON TX, 10G PON TX etc. . . . An optical multiplexer (MUX) is employed to combine the WDM channels, with the aggregate signal sent into the feeder fiber for downstream transmission.

Figure 1A:
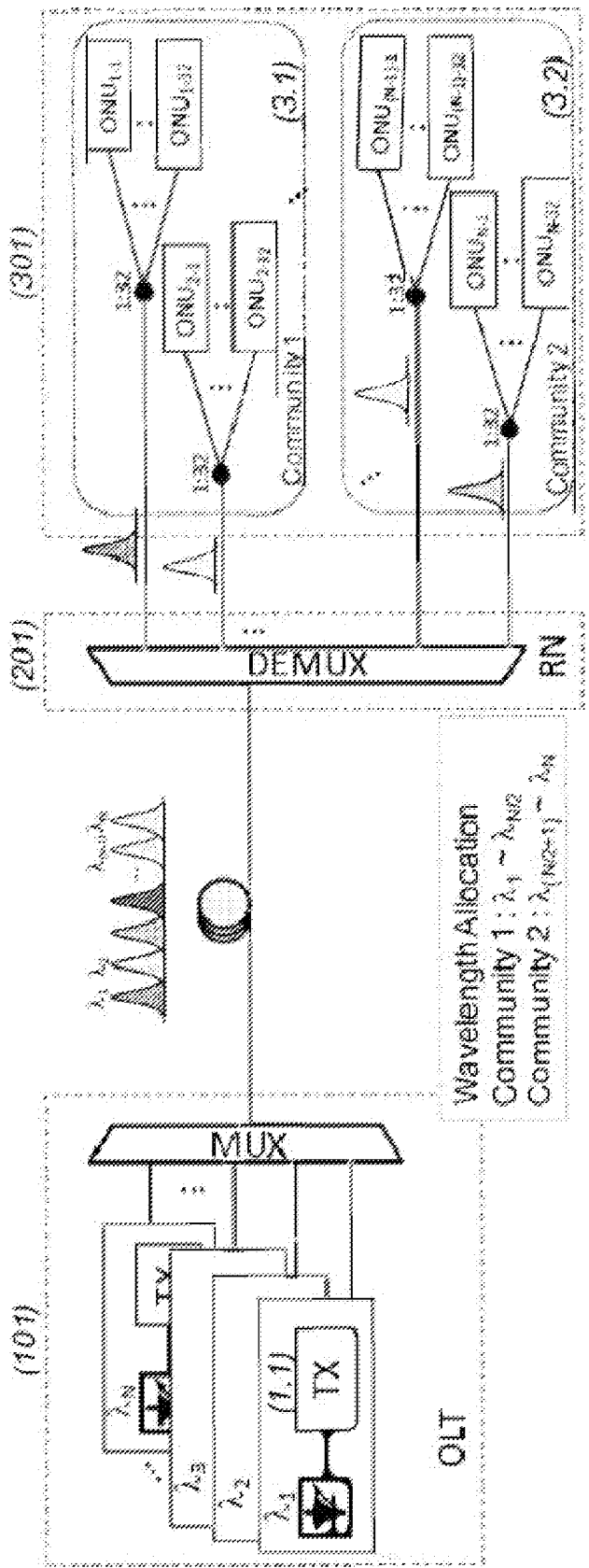
FIG. 1(a), (b) are diagrams showing exemplary configurations for dynamic traffic allocation in hybrid WDM/TDM PON systems, in accordance with the invention.

FIG. 1(a) shows the traffic requirement in the normal mode. In the remote node (RN) (201), an optical de-multiplexer (DEMUX), such as array waveguide grating (AWG), is used to separate N WDM channels for delivery to N ONU groups. Based on TDM-PON technology, Each ONU group has its own WDM channel and share the data (such as ONU group 1 ($ONU_{1-1} \sim ONU_{1-32}$) share $\lambda_1$, ONU group 2 ($ONU_{2-1} \sim ONU_{2-32}$) share $\lambda_2$ etc.). If we split all of the WDM channels into two communities, half of the WDM signals would be delivered to Community 1 ($\lambda_1 \sim \lambda_{N/2}$) (3.1) and half of the channels would send to Community 2 ($\lambda_{(N/2+1)} \sim \lambda_N$) (3.2). For example, if there are 10 WDM channels sending from the OLT, in the normal situation, $\lambda_1 \sim \lambda_5$ will send to Community 1 and delivery the services to ONU group 1-5. Meanwhile, $\lambda_6 \sim \lambda_{10}$ will send to Community 2 and delivery the services to ONU group 6-10. In this existing system, there is no flexibility for the wavelength routing function.

Figure 1B:
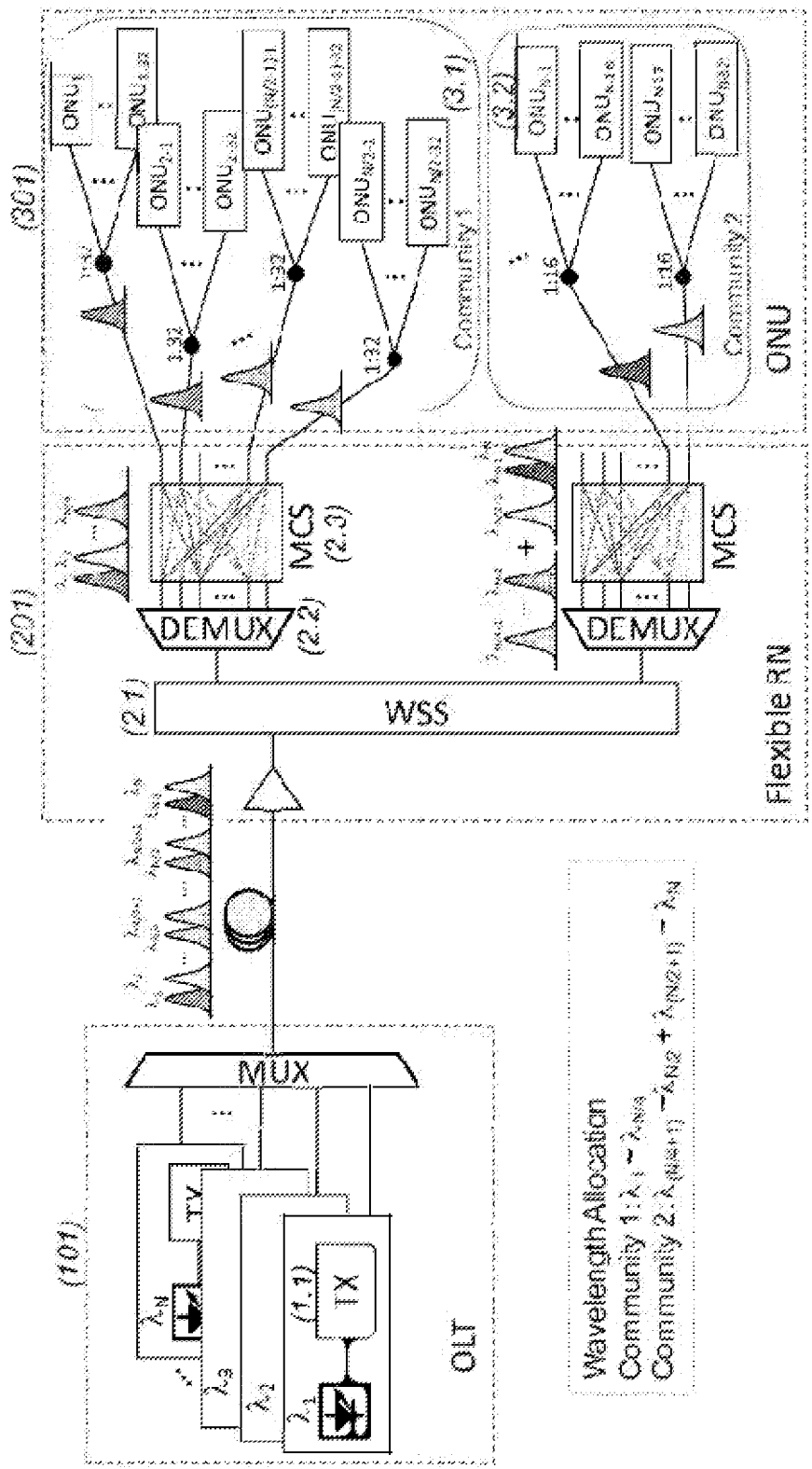

The proposed new flexible remote node RN is showing in FIG. 1(b), it contains wavelength selective switch (WSS) (2.1), DEMUX (2.2) and multi-cast switch (MCS) (2.3). Based on the capacity requirement, the WDM channels can be individual selected and send to the DEMUX. The output ports of the WSS can be designed due to the number of the communities. After the DEMUX, the signal is fed into a multi-cast switch MCS. The MCS has a combination function of switching and splitting. Any wavelength can be routed from any direction, including the same wavelength from different directions to any port. By using flexible RN, wired and wireless traffic can be delivered to each user arbitrary. When the traffic requirement in the Community 2 increased, some of the WDM channels from Community 1 can be switched and delivered to Community 2. Therefore, the traffic jam in Community 2 can be solved resulted from more WDM channels. For example, two WDM channels can be sent to ONU group N ($ONU_{N-1}$~$ONU_{N-16}$ share one WDM signal and $ONU_{N-17}$~$ONU_{N-32}$ share another wavelength) instead of one WDM channel ($ONU_{N-1}$~$ONU_{N-32}$ share one channel) and double the capacity. Meanwhile, two ONU groups ($ONU_{1-1}$~$ONU_{1-32}$ and $ONU_{2-1}$~$ONU_{2-32}$) in Community 1 will share the same wavelength if they don't have huge capacity requirement. If half of WDM channels from Community 1 need to be send to Community 2, the wavelength allocation would be $\lambda_1$~$\lambda_{N/4}$ to Community 1 and $\lambda_{N/4+1}$~$\lambda_{N/2}$+~$\lambda_{N/2+1}$~$\lambda_N$ to Community 2.

Figure 2:
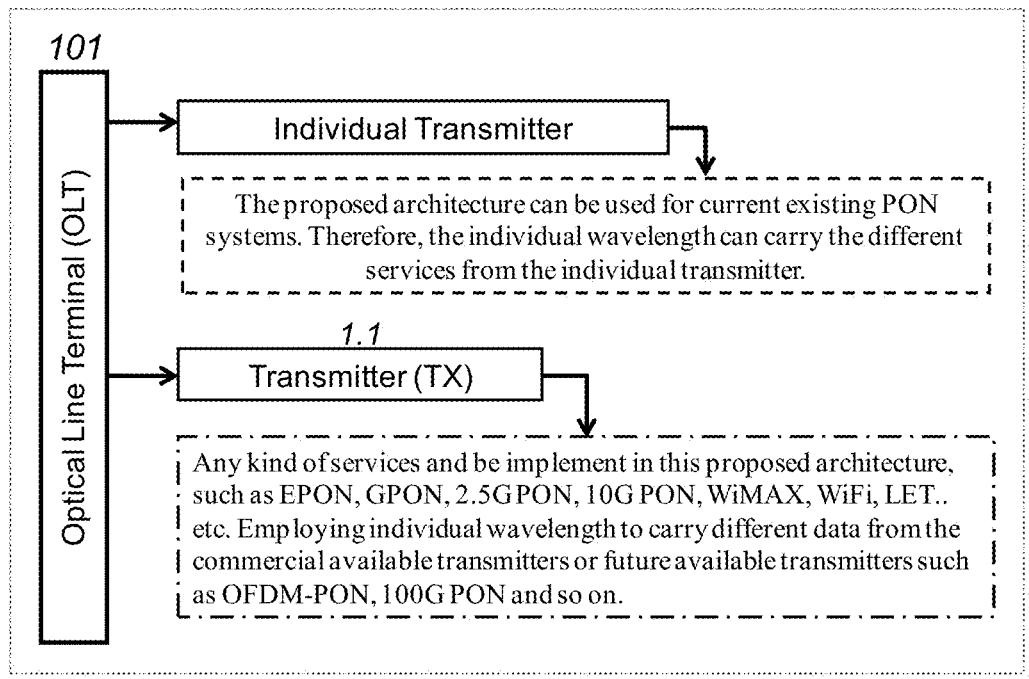
FIG. 2 is a diagram showing key aspects of the optical line terminal (OLT) shown in FIG. 1, in accordance with the invention.

The diagram of FIG. 2 shows key aspects of the optical line terminal (OLT) 101. With respect to each individual transmitter, the proposed configuration can be used for current existing PON systems. Therefore, individual wavelengths can carry different services from an individual transmitter. The transmitter (TX) 1.1 can enable implementation of any kind of service in the configuration shown, such as EPON, GPON, 2.5GPON, 10GPON, WiMax, WiFi, LET, etc. The transmitter enables employing individual wavelengths to carry data from the commercially available transmitters or future available transmitters such as OFDM-PON, 100 G PON and so on.

Figure 3:
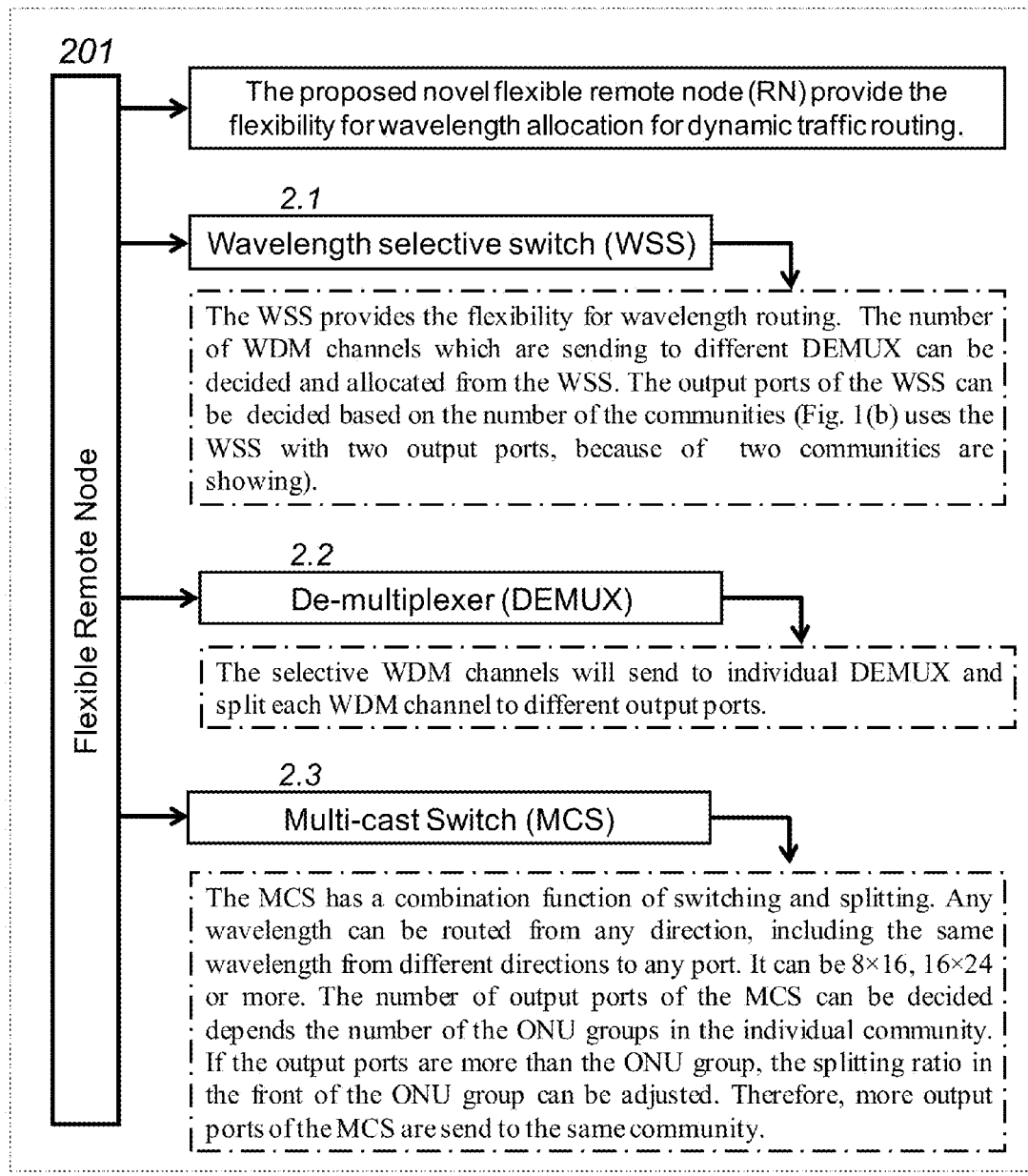
FIG. 3 is a diagram showing key aspects of the flexible remote node shown in FIG. 1, in accordance with the invention.

The diagram of FIG. 3 shows key aspects of the flexible remote node 201, in accordance with the invention. The inventive aspects of the remote flexible node (RN) provide the flexibility for wavelength allocation for dynamic traffic routing. The wavelength selective switch WSS 2.1 provides the flexibility for wavelength routing. The number of WDM channels which are being sent to different demultiplexers DEMUX can be decided and allocated from the WSS. The output ports of the WSS can be decided based on the number of the communities (see FIG. 1 (b)) using the WSS with two output ports. The selective WDM channels will be sent to individual de-multiplexer DEMUX 2.2 and split each WDM channel to different output ports. The multi-cast switch MCS 2.3 has a combined function of switching and splitting. Any wavelength can be routed from any direction, including the same wavelength from different directions to any port. It can be 8i 16, 16i 24 or more. The number of output ports of the MCS that can be decided depends on the number of the ONU groups in the individual community. If the output ports are more than the ONU group, the splitting ration in the front ONU group can be adjusted. Therefore, more output ports of the MCS are sent to the same community.

Figure 4:
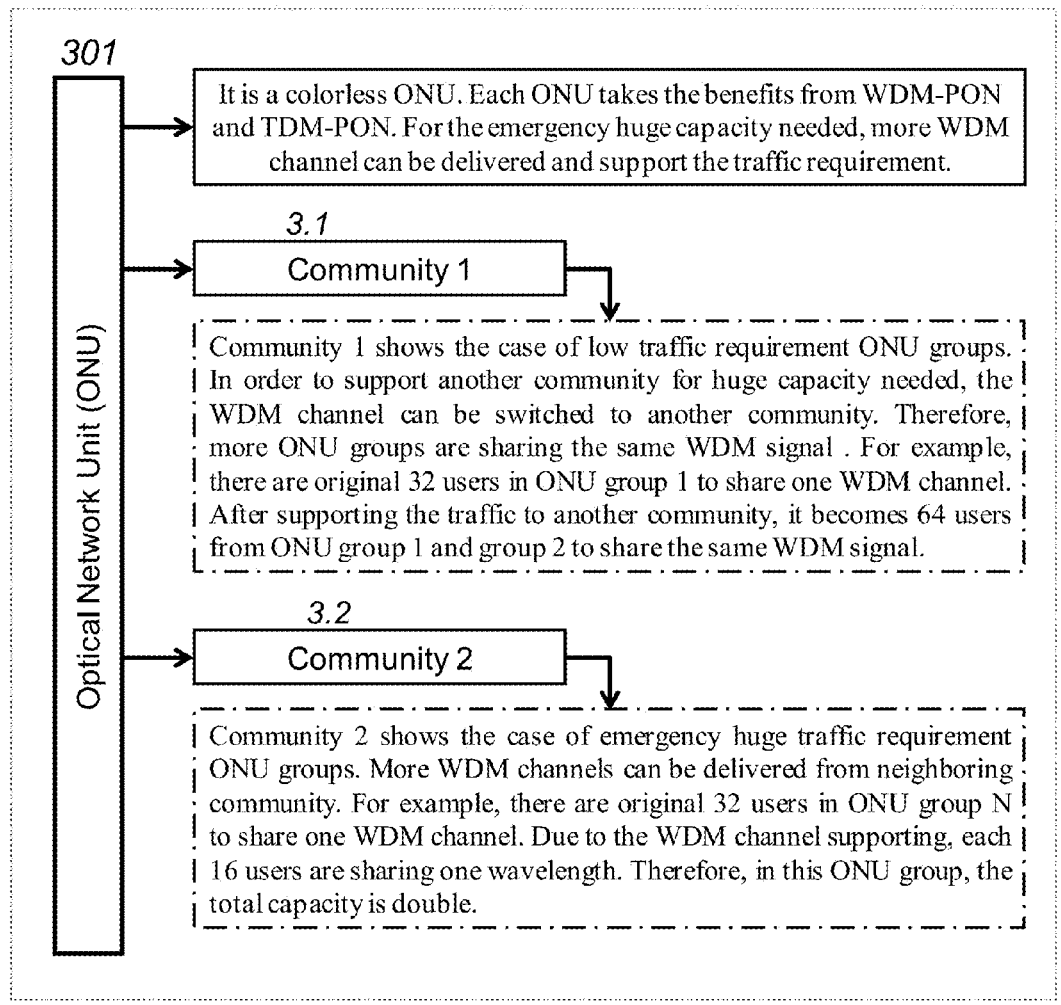
FIG. 4 is a diagram showing key aspects of the key aspects of the optical network unit (ONU) shown in FIG. 1, in accordance with the invention.

The diagram of FIG. 4 shows key aspects of the optical network unit (ONU) 301, in accordance with the invention. In a colorless ONU, each ONU takes the benefits from WDM-PON and TDM-PON. For an emergent huge capacity need, more WDM channels can be delivered to support the traffic requirement. Community 1 (3.1) shows the case of low traffic requirement ONU groups. In order to support another community for a huge capacity need, the WDM channel can be switched to another community. Therefore, more ONU groups are sharing the same WDM signal. For example, there are originally 32 users in ONU group 1 to share one WDM channel. After supporting traffic to another community, it becomes 64 users from ONU group 1 and ONU group 2 to share the same WDM signal. Community 2 shows the case of an emergent huge traffic requirement ONU groups. More WDM channels can be delivered from a neighboring community. For example, there are originally 32 users in ONU group N to share one WDM channel. Due to the WDM channel support, each 16 users are sharing one wavelength. Therefore, in this ONU group, the total capacity is double.

The invention may be implemented in hardware, firmware or software, or a combination of the three. The hardware including optical components shown in FIGS. 1(a) and (b). Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 5:
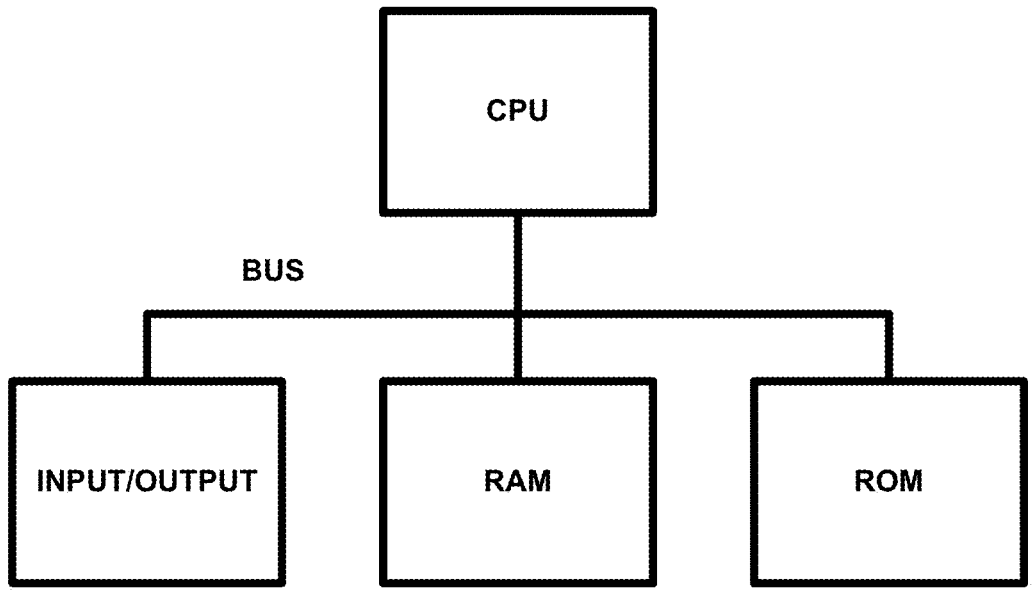
FIG. 5 shows an exemplary computer to perform the inventive cyclic decoding of cascaded FEC codes.

By way of example, a block diagram of a computer to support the system is discussed next in FIG. 5. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention is a new and easy solution for dynamic traffic allocation to support emergency traffic jam relief and keep services up all the time. None of the users would incur lost signals at any time. The inventive flexible remote node is a new technology that enables dynamic traffic allocation, which can be implemented in PON systems and mobile backhaul applications. Based on the wavelength routing flexibility from the flexible remote node, the traffic can be switched from low capacity requirement area to support emergency huge capacity needed immediately. For current existing technology, some of the users need to be idle and waited due to the bust traffic jam. With this invention, applied to current existing technology, none of the users would lose signals at any time.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for dynamically allocating traffic in a passive optical communication system, the method comprising the steps of:
   i) employing an individual wavelength channel to carry different data services from an individual transmitter;
   ii) configuring an optical network unit into optical network unit groups serving at least two community of users; and
   iii) providing a flexible remote node with wavelength routing flexibility including switching wavelength traffic from optical network user groups with capacity requirements to optical network user groups with increased wavelength traffic requirements using a wavelength selective switch (WSS) that allocates channels sent to demultiplexers and WSS output ports based on a number of communities and a multi-cast switch with both switching and splitting, wherein a predetermined wavelength is routed from any direction, including the same wavelength from different directions to any port.

2. The method of claim 1, wherein the flexible remote node with wavelength routing flexibility comprises a wavelength selective switch for providing flexible wavelength routing the wavelength selective switch deciding and allocating a number of wavelength channels being sent to a de-multiplexer.

3. The method of claim 2, wherein the wavelength selective switch comprises output ports based on a number of the community of users.

4. The method of claim 2, wherein the flexible remote node comprises a de-multiplexer to which selective wavelengths are sent and split to different output ports of the wavelength selective switch.

5. The method of claim 1, wherein the flexible remote node comprises a combined switching and splitting for routing any wavelength from any direction, including the same wavelength from different directions to any port of a wavelength selective switch.

6. The method of claim 5, wherein a number of output ports of the combined switching and splitting is based on number of optical network user groups in the individual community.

7. The method of claim 6, wherein if the number of output ports are greater than optical network groups, a splitting ration in a front optical network group can be adjusted, thereby enabling more output ports being sent to the same community.

8. A system for dynamically allocating traffic in a passive optical communication system, the system comprising:
   an optical line terminal for employing an individual wavelength channel to carry different data services from an individual transmitter;
   an optical network unit configured into optical network unit groups serving at least two community of users; and
   a flexible remote node with wavelength routing flexibility including switching wavelength traffic from optical network user groups with capacity requirements to optical network user groups with increased wavelength traffic requirements and a wavelength selective switch (WSS) that allocates channels sent to demultiplexers and WSS output ports based on a number of communities and a multi-cast switch with both switching and splitting, wherein a predetermined wavelength is routed from any direction, including the same wavelength from different directions to any port.

9. The system of claim 8, wherein the flexible remote node comprises a wavelength selective switch for providing flexible wavelength routing the wavelength selective switch deciding and allocating a number of wavelength channels being sent to a de-multiplexer.

10. The system of claim 9, wherein the wavelength selective switch comprises output ports based on a number of the community of users.

11. The system of claim 9, wherein the flexible remote node comprises a de-multiplexer to which selective wavelengths are sent and split to different output ports of the wavelength selective switch.

12. The system of claim 8, wherein the flexible remote node comprises a combined switching and splitting for routing for routing any wavelength from any direction, including the same wavelength from different directions to any port of a wavelength selective switch.

13. The system of claim 12, wherein a number of output ports of the combined switching and splitting is based on number of optical network user groups in the individual community.

14. The system of claim 13, wherein if the number of output ports is greater than the number of optical network groups, a splitting ration in a front optical network group is adjusted to enable more output ports being sent to the same community.

* * * * *